United States Patent [19]

Scholl et al.

[11] 4,059,714
[45] Nov. 22, 1977

[54] HOT MELT THERMOPLASTIC ADHESIVE FOAM SYSTEM

[75] Inventors: Charles H. Scholl, Vermilion; John R. Janner, Jr., Lorain; William C. Stumphauzer, Elyria, all of Ohio

[73] Assignee: Nordson Corporation, Amherst, Ohio

[21] Appl. No.: 710,377

[22] Filed: Aug. 2, 1976

[51] Int. Cl.² .............................................. B32B 5/18
[52] U.S. Cl. ...................................... 428/310; 156/78; 156/334; 156/500; 222/146 HE; 261/28; 261/DIG. 26; 264/45.9; 264/46.4; 428/339; 366/301
[58] Field of Search ................ 264/45.9, 46.4; 259/95, 259/6; 156/78, 79, 331, 334, 500; 222/146 HE; 261/28, 84, 93, DIG. 26; 428/310, 339

[56] References Cited

U.S. PATENT DOCUMENTS

| | | | |
|---|---|---|---|
| 2,324,116 | 7/1943 | Sivertsen | 261/28 |
| 3,415,714 | 12/1968 | Hider | 156/79 |
| 3,662,927 | 5/1972 | Cocks | 222/146 HE |
| 3,792,801 | 2/1974 | Baker et al. | 222/146 HE |
| 3,942,687 | 3/1976 | Walus et al. | 222/146 HE |
| 3,945,535 | 5/1976 | Leiste et al. | 222/146 HE |

*Primary Examiner*—Edward G. Whitby
*Attorney, Agent, or Firm*—Wood, Herron & Evans

[57] ABSTRACT

A novel method and several different unique modifications of apparatus are disclosed for manufacturing a novel adhesive product. The product which results from use of the foam is a pair of substrates adhered together by compressed foam. The adhesive foam is created by intimately mixing air or any relatively inert gas with thermoplastic adhesive while the adhesive is in the liquid state and then pressurizing the liquid/gas mixture so as to force the gas into solution with the liquid adhesive. The liquid adhesive is subsequently dispensed at atmospheric pressure with the result that the gas is released from the solution and becomes entrapped in the adhesive to form a homogenous closed cellular adhesive foam.

36 Claims, 13 Drawing Figures

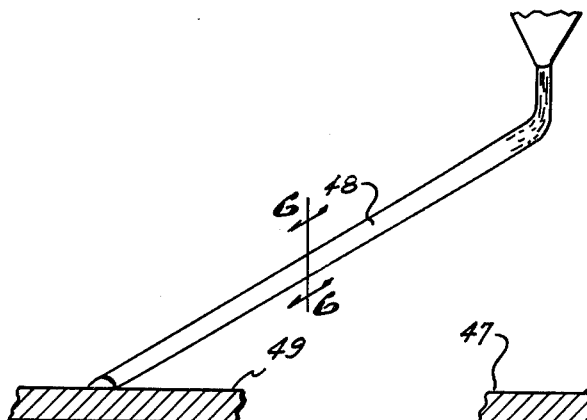
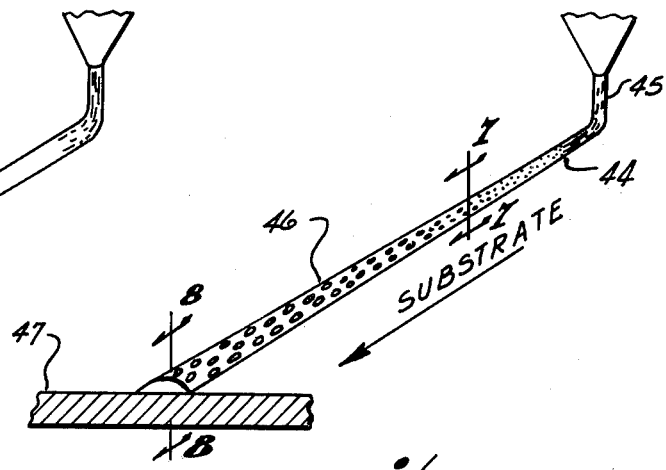
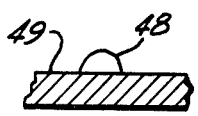
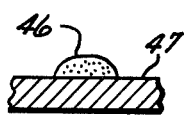
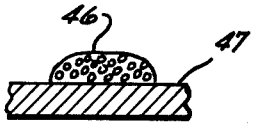
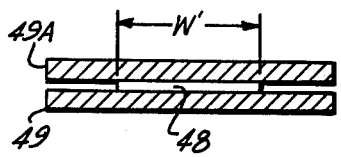
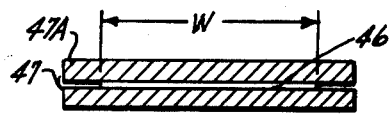
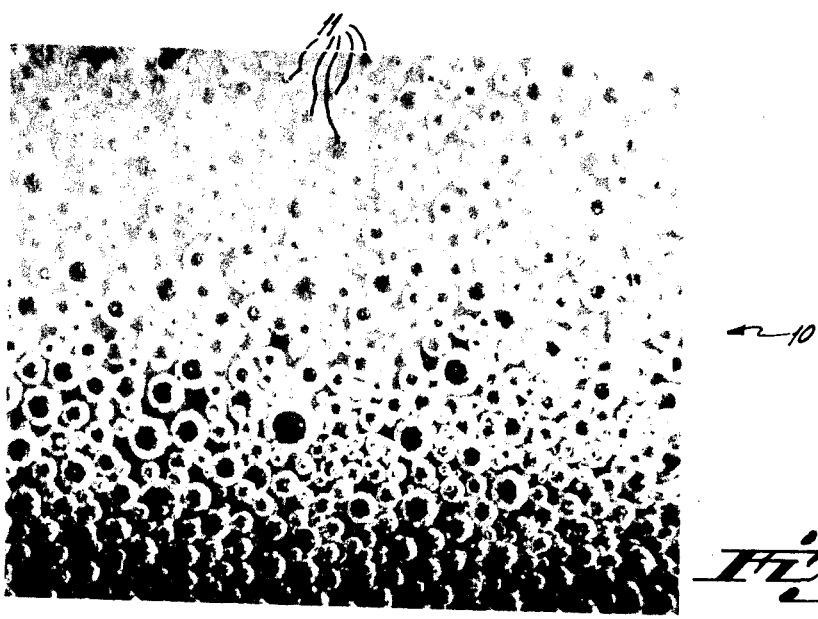

HOT MELT THERMOPLASTIC ADHESIVE FOAM SYSTEM

Hot melt thermoplastic adhesives or so-called "hot melts" are widely used throughout industry for adhering many different diverse products. One of the most common applications of such adhesives is for packaging and cartoning where the quick setting time of this type of adhesive is particularly advantageous.

One of the most common problems with hot melt adhesives is that of compressing the adhesive after application so as to obtain sufficient surface contact between the adhesive and adhered substrate to achieve a good bond. The relatively high viscosity, high surface tension, and quick setting time of hot melt adhesives all combine to prevent the adhesive from spreading over a large surface area when the adhesive is applied as a liquid to the substrate. Instead of spreading, the liquid sets up as a thick bead on the structure. Even when quickly compressed, as for example, between two flaps of a carton, the adhesive is difficult to spread. Generally, when two adhered surfaces are pulled apart, it is found that the bond breaks in the adhesive to substrate interface. Consequently, the greater the area of interface or surface contact, the greater is the strength of the bond.

We have discovered, and one aspect of this invention is predicated upon the discovery that the adhesive strength of a bond achieved with a given quantity of a selected hot melt adhesive may be appreciably improved and in most instances at least doubled if the adhesive is applied as a cellular foam rather than as a conventional non-foamed adhesive.

The increased bonding strength of the foamed adhesive, at least in part, results from the fact that the foamed adhesives may be spread over at least twice the area as the same adhesive in the non-foamed state under the same compressive conditions. Since the strength of the bond is a function of the area covered by the bond, this foaming of the adhesive results in a given quantity of adhesive generating approximately twice as strong a bond as the same adhesive unfoamed.

This greater spreadability of foamed as opposed to unfoamed hot melt adhesive is attributable to several physical characteristics of the foam. Specifically, conventional molten hot melt adhesive is very viscous and is analogous to molten glass which requires substantial energy input to cause flow. In contrast, foamed hot melt adhesive is less viscous and requires much less energy to effect flow. In other words, a greater volume of foamed hot melt adhesive in sit molten state may be moved or flattened by a given force per unit of time than may be moved or flattened by the same force acting upon the same molten adhesive in an unfoamed state. Additionally, molten adhesives are incompressible while foamed molten adhesives are compressible because of the presence of gas bubbles contained in the foamed adhesive. Furthermore, the gas bubbles in the foamed molten adhesive have a tendency to lower the viscosity and density of the adhesive as well as making the adhesive readily compressible.

Foamed hot melt adhesive has also been found to have other important advantages over the same adhesive applied and used in the unfoamed state. Specifically, it has been found to have a longer "open" time during which it retains its bonding strength after being dispensed onto a substrate. It has also been found to set up and adhere faster when compressed between two substrates, as for example two flaps of a carton. These two characteristics together are very desirable in cartoning applications because they eliminate the need to instantly close flaps after application of the adhesive and also permit the adhered surfaces to be released from clamping pressure soon after application of that pressure. Together these two characteristics permit greater manufacturing tolerances and consequently expand the range of application of hot melt adhesives.

The longer "open" time of the foamed adhesive over the same unfoamed adhesive results from the small air or gas containing cells of the foam acting as insulative barriers to prevent the escape of heat and consequent solidification of the liquid adhesive. When the foamed adhesive is subsequently spread between the adhered surfaces by the application of clamping pressure it spreads over approximately twice the area of the unfoamed adhesive with the result that the greater surface contact causes the foamed adhesive to then give up its heat faster than the unfoamed adhesive.

Another important aspect of this invention resides in the method of manufacturing the hot melt adhesive foam. We have found that if air or a gas such as nitrogen is thoroughly mixed with a liquid hot melt adhesive and is then forced into solution with the liquid adhesive by high pressure, as for example 300 pounds per square inch, the gas goes into solution with the adhesive. When the adhesive/gas solution is subsequently dispensed from a conventional valved type of adhesive dispenser the gas comes out of solution and becomes entrapped in the adhesive to form a closed cell solid adhesive foam having the desirable adhesive characteristics described hereinabove.

In one preferred embodiment of the invention, the solid thermoplastic adhesive material is heated and melted in a heated reservoir. The molten adhesive is then mixed with air and pressurized by either a one step or two step geared pump. Within the geared pump the gas and liquid adhesives are thoroughly mixed and the gas is forced under pump outlet pressure into solution with the liquid adhesive. The pressurized liquid/gas adhesive solution is then supplied to a valved type of adhesive dispensing gun from which the adhesive is dispensed at atmospheric pressure. Upon emerging from the outlet nozzle of the dispenser, the gas evolves from the solution in the form of small bubbles causing the adhesive to expand volumetrically. The resultant adhesive in an uncompressed state sets up as a homogenous solid foam having closed air or gas cells evenly distributed throughout the adhesive.

Heretofore large bubbles have often accidently been generated in thermoplastic adhesive but these large bubbles were not in solution in the adhesive and did not result in uniform foamed adhesive. Rather, those large bubbles simply became large randomly spaced voids in the adhesive accompanied by small amounts of foamed adhesive in separate droplets as opposed to the small, regularly spaced cells or pockets generated throughout a continuous extrusion in the adhesive by the invention of this application. In general, in the past whenever large air bubbles appeared in the adhesive, it was the result either of the liquid reservoir running dry of adhesive, cavitating the pump, or of water getting into the adhesive and forming steam pockets. Whenever those conditions occurred, the system would sputter and spit adhesive from the outlet nozzle and create a very uneven deposit of adhesive material on the substrate. As soon as possible after appearance of this condition, every effort was made to remedy it by eliminating the sputtering and bubbles.

The invention of this application is predicated upon the deliberate creation of small regularly spaced air or gas pockets throughout the hot melt adhesive as opposed to the undesirable large and randomly spaced bubbles often inadvertently and accidently created by poor melting and dispensing practices.

The invention of this application is applicable to very nearly any hot melt adhesive application but it is particularly well suited to cartoning and packaging applications in which it has heretofore been difficult, because of limited available compressive forces, to achieve good wetting of large substrate surfaces by the adhesive. This invention will in most of those applications result in at least a 50% reduction in the total quantity of adhesive required to effect the same or a better bond and without any appreciable additional material cost since the gas or air used for forming the foam is available at little or no cost.

In utilizing the foamed adhesive of the present invention, the surface area necessary for achieving an acceptable bond with a substrate(s) requires a smaller mass of foamed molten adhesive than with the same kind of non-foamed molten adhesive.

The utility of this invention is realized by a reduction in weight of applied adhesive, which means less consumption of adhesives and less cost to the manufacturer.

These and other advantages of the invention will be more apparent from the following detailed description taken in conjunction with the drawings in which:

FIG. 4 is a perspective view of an adhesive dispenser nozzle illustrating the form of a bead of unfoamed adhesive dispensed from the nozzle.

FIG. 5 is a view similar to FIG. 4 but illustrating the configuration of a foamed adhesive bead produced in accordance with the practice of the invention of this application.

FIG. 6 is a cross-sectional view taken on line 6—6 of FIG. 4.

FIG. 7 is a cross-sectional view taken on ine 7—7 of FIG. 5.

FIG. 8 is a cross-sectional view taken on line 8—8 of FIG. 5.

FIG. 9 is a cross-sectional view of a pair of substrates between which a non-foamed bead of adhesive is compressed.

FIG. 10 is a view similar to FIG. 9 but illustrating the greater degree of compression effected by the same force on the same adhesive as pictured in FIG. 9 but with the adhesive in a foamed condition.

FIG. 11 is a photograph blown up 20 times of a cross section through an adhesive foam made in accordance with the practice of this invention.

The invention of this application resides in a novel product resulting from compression of a hot melt thermoplastic adhesive foam between two substrates to effect adhesion of the substrates. This invention also resides in the method by which the foam is made, and the apparatus for practicing that method to generate the foam. With reference to FIG. 11 there is shown in photographic form a hot melt thermoplastic adhesive foam 10 made in accordance with the practice of this invention. This foam 10 was made from a conventional hot melt adhesive, Eastabond A-3 adhesive, a polyethylene base material manufactured by Eastman Chemical Company of Rochester, New York. Regularly spaced throughout the foam 10 are closed air cells 11 created by entrappment of air bubbles evolved from a solution of air in the liquid molten adhesive. These cells 11 are formed after the liquid adhesive/air solution is dispensed from a conventional high pressure hot melt adhesive dispenser 12 (FIG. 1A). As may be seen in FIG. 11, the air cells 11 are relatively evenly spaced throughout the foam and are of substantially the same size throughout. In the illustrated embodiment, the air cells vary from 0.1 millimeters to 0.7 millimeters in diameter. In other practices of the invention, satisfactory hot melt foam adhesives have been created having cells as small as 0.1 millimeters in diameter reqularly spaced throughout the adhesive or as large as 0.7 millimeters in diameter. The size of the air cells in the foam is not critical so long as the foam is homogenous and has air cells regularly distributed throughout. Of course, the cells cannot be so large that when the foam is subsequently compressed between two substrates, as illustrated in FIG. 10, the cells break and create voids so thick as to extend completely through the compressed adhesive.

Figure 1:
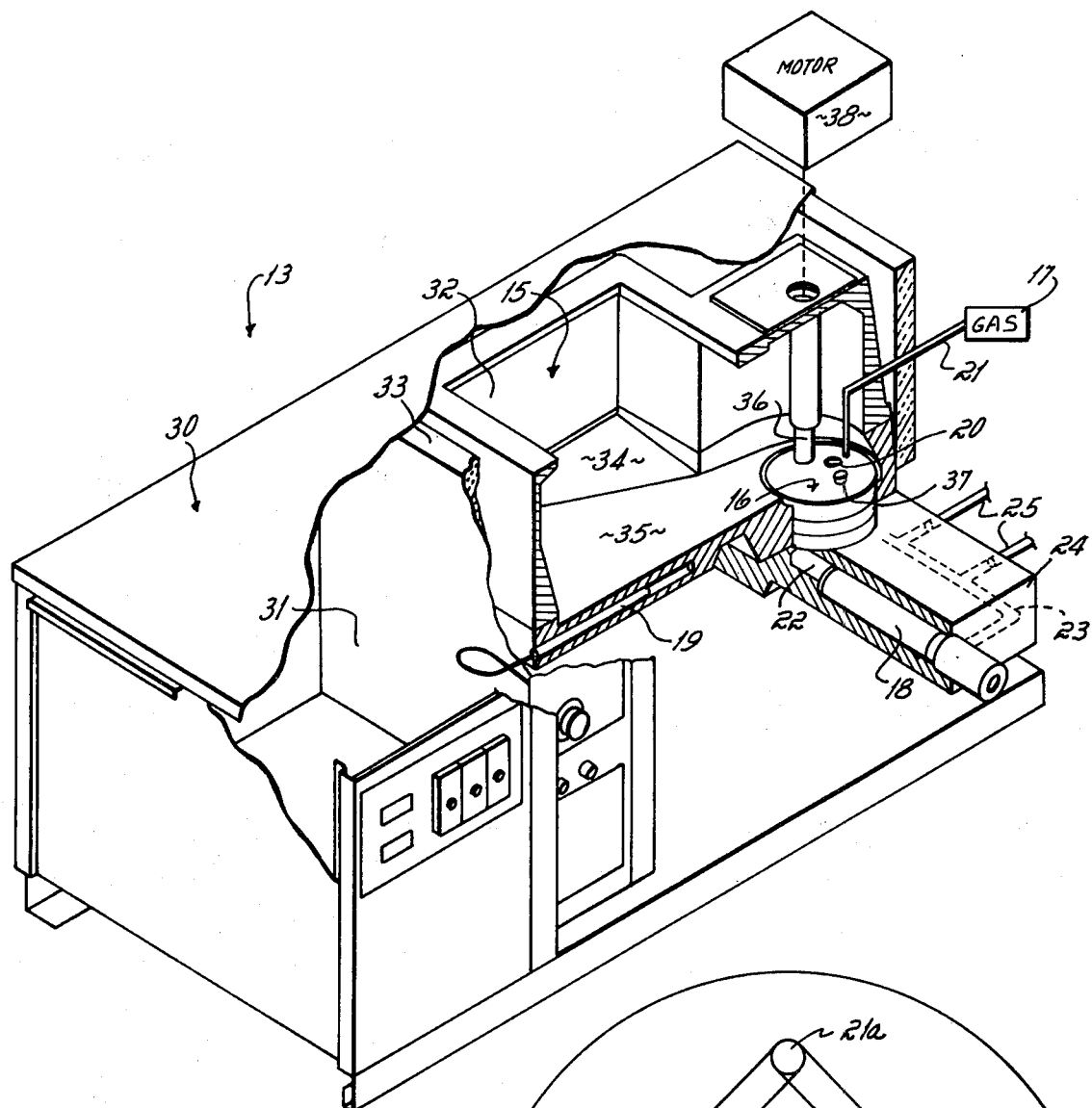
FIG. 1 is a perspective view, partially broken away, of a hot melt application system incorporating the invention of this application.
Figure 1A:
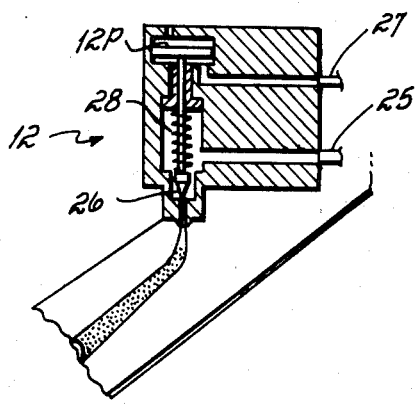
FIG. 1A is a partially diagrammatic perspective view of the dispensing gun portion of the system illustrated in FIG. 1.
Figure 1B:
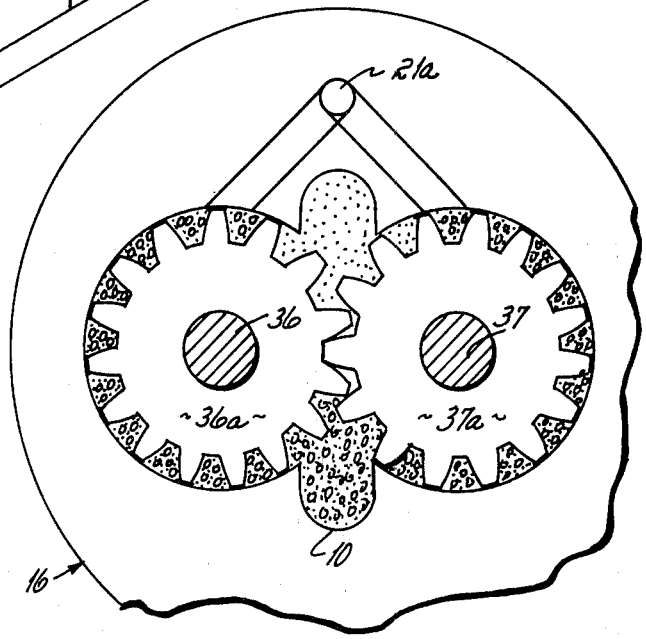
FIG. 1B is a cross sectional view through the gear pump of FIG. 1.

Referring now to FIG. 1 there is illustrated one preferred embodiment of apparatus used in the practice of this invention. In general, this apparatus comprises a melting tank 15, a gear pump 16, an air or gas supply 17, a filter 18, and the dispenser 12. In practice, solid thermoplastic adhesive in the form of pellets, blocks, or slugs are placed in the reservoir 15 and there melted by heaters 19 contained in the bottom wall of the reservoir. The molten thermoplastic adhesive then flows by gravity to the inlet 20 of the pump 16. Low pressure gas, as for example air at a pressure slightly above that of the atmosphere, is also simultaneously supplied from the source 17 through a gas inlet line 21 to an air inlet port 21a of the pump 16. The thermoplastic adhesive and air flow through the inlets 20, 21a into the interior of the gear pump 16 where the meshing teeth of a pair of gears 36a, 37a cause the gas and molten adhesive to be thoroughly mixed (in much the same manner as mixing air into cream to form whipped cream) and to be forced under pressure into a liquid adhesive/gas solution 10. The solution then flows from the outlet of the pump through conduit 22, the filter 18, into outlet conduits 23 of a manifold block 24 and through hoses 25 to the dispensing gun 12. The gear pump 16 is thus operable to increase the pressure of the gas and molten adhesive mixture to a pressure of approximately 300 pounds per square inch, which pressure is maintained through the conduits 23 of the manifold block 24 and the hoses 25 to the dispenser gun 12. At this pressure, the air or gas contained within the molten adhesive is maintained in solution with the molten adhesive, in which condition it remains until dispensed from the gun 12.

In the illustrated embodiment, the gun 12 contains a pneumatically operated piston 12P attached to a flow control valve 26. When air pressure is supplied through an inlet line 27 of the gun, it causes the piston 12P to push upwardly against a spring 28 and thereby opens the valve 26 so as to allow molten adhesive under approximately 300 pounds per square inch to flow from the gun. The molten adhesive/gas solution emerges in a thin clear liquid stream which quickly expands as tiny gas bubbles appear. These bubbles first become visible and the solution first takes on the appearance of a foam approximately one-half inch from the nozzle outlet. The tiny gas bubbles enlarge and become entrapped within the molten adhesive as it solidifies and thereby form a foam having the cellular structure depicted in FIG. 11.

The heated reservoir 15 and pump 16 dispensing apparatus 13 are contained within a sheet metal housing 30. This housing is divided into two sections, a control section 31 and a reservoir section 32. The two sections are separated by a heat insulated barrier 33 which protects the electrical apparatus contained within the control section 31 from the heat generated by the reservoir 15. Within the control section are the usual temperature control thermostats as well as the temperature setting and measuring gauges.

The reservoir 15 is a conventional open top melting pot having bottom walls 34, 35 which slope downwardly toward the inlet opening 20 of the pump 16. The bottom walls of the reservoir contain the heaters 19 which are generally operative to heat the solid thermoplastic material to a temperature slightly in excess of its melting temperature. That temperature is usually on the order of 175° F. to 350° F. for most hot melt adhesives.

The gear pump 16 is a conventional single stage gear pump having intermeshing gear teeth (not shown) which operate as multiple small pistons to pull incoming liquid into the pump, pressurize it, and dispense it from the pump outlet. Such pumps generally create a suction on their inlet opening so as to draw the liquid into the pump. In the illustrated embodiment, gas as for example air or nitrogen, is also supplied to the pump inlet 21a via an inlet tube 21, the outlet of which terminates at the entrance port 21a of the pump.

The two intermeshing gears 36a, 37a of the pump 16 are mounted upon a pair of parallel shafts 36, 37. One of these shafts 36 is driven by a motor, as for example a pneumatic motor 38, while the other 37 is an idler shaft.

A more complete description of the gear pump 16 utilized in the practice of this invention may be found in the co-pending application of Charles H. Scholl, Ser. No. 549,189 now U.S. Pat. No. 3,964,645 for "Apparatus for Melting and Dispensing Thermoplastic Material", which application is assigned to the assignee of this application. That pending application though discloses a pump which includes a special head or cap operable in cooperation with the shafts 36, 37 to positively force or pump thermoplastic material into the inlet port 20 of the pump. We have found that in order for the pump disclosed in that pending application to operate properly in the practice of this invention, the special cap must be removed in order to eliminate the positive inlet pressure which otherwise inhibits the entrance of gas into the gas conduits of the pump. With the special cap removed though, that pump is very suitable for the practice of this invention.

Figure 2:
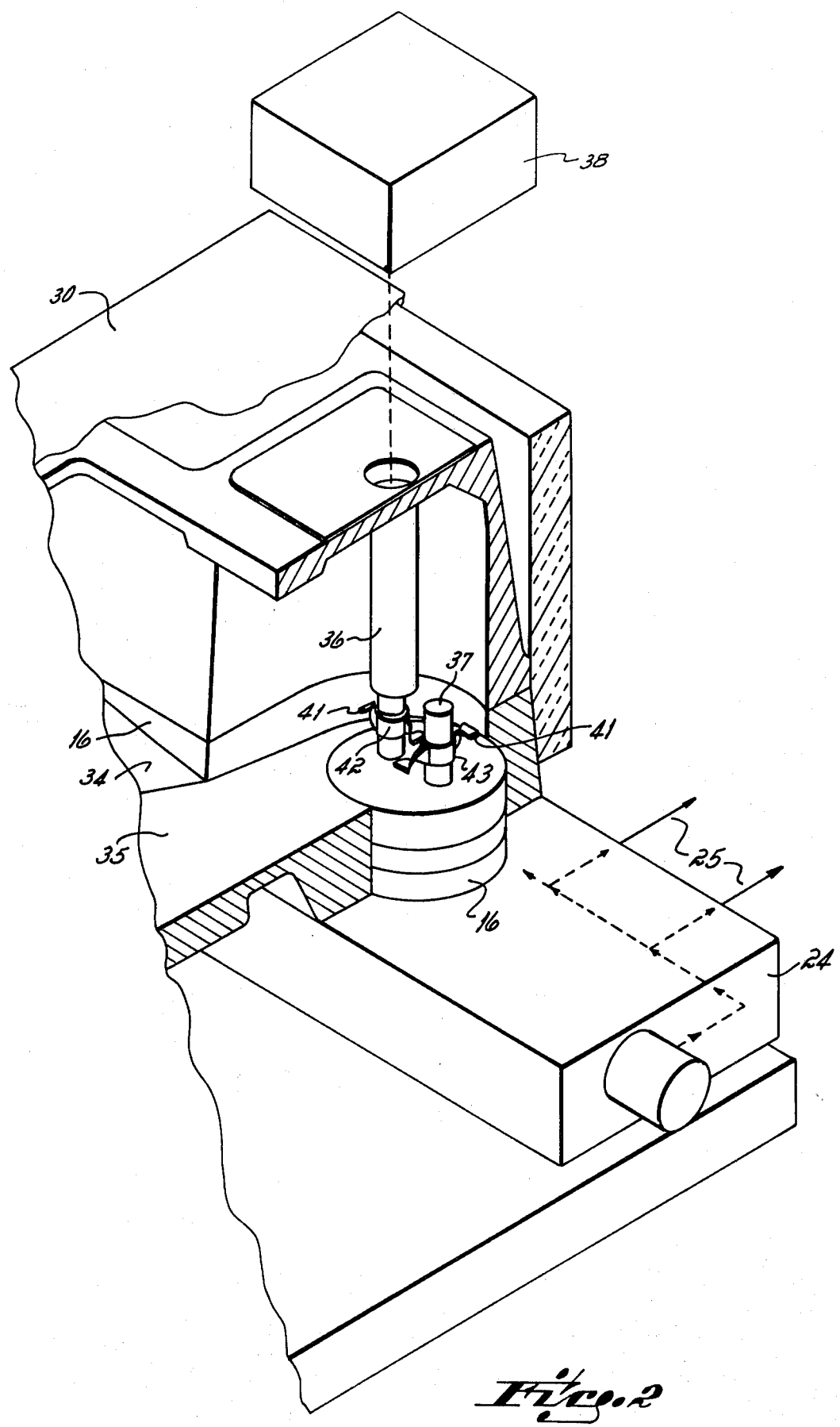
FIG. 2 is a partially diagrammatic perspective view of a portion of a second modification of the system illustrated in FIG. 1.

Referring now to FIG. 2, there is disclosed a second modification of the pump which may be utilized in the practice of this invention. In this modification, the air inlet line 21 and air inlet port 21a of the pump are omitted and air is simply sucked into the pump from the air chamber contained above the molten adhesive. In this modification, intermeshing blades 41 attached to hubs 42, 43 are non-rotatably keyed to the drive shaft 36 and idler shaft 37. In operation, the blades 41 rotate and wipe across the entrance port 20 of the gear pump 16 as the two shafts 36, 37 rotate. In wiping across the entrance port 20 of the pump, the wiper blades prevent an air vortex from forming and drawing air without the presence of a sufficient quantity of liquid into the pump. In other words, the wiper blades 41 have the effect of breaking up any air vortex and of forcing liquid to enter the inlet port together with air pulled into the port by the vacuum or suction created by the gears of the pump.

In operation of the system disclosed in either FIG. 1 or FIG. 2, solid thermoplastic adhesive in the form of pellets, blocks or chunks are placed in the reservoir 15 where the solid thermoplastic material melts and forms a pool or reservoir or molten material. This pool or reservoir flows downwardly over the downwardly sloping bottom walls 34, 35 of the reservoir to the inlet port 20 of the gear pump 16. In the case of the modification illustrated in FIG. 1, air or nitrogen or any gas which is inert in the presence of the liquid adhesive, is fed at a pressure slightly above atmospheric pressure, as for example five pounds per square inch or less through the gas conduit 21 to the entrance port 21a. In the case of the modification illustrated in FIG. 2, air is sucked into the port 20 from the air chamber contained above the pool of liquid adhesive within the reservoir. The simultaneously entering gas and liquid are then thoroughly mixed within the pump 16 and forced under pressure through the pump outlet into the fluid flow conduit 22. Within the conduit 22 the liquid/gas combination is at a relatively high pressure, on the order of 300 pounds per square inch, at which pressure it has been found that the gas goes into solution with the liquid. The liquid/gas solution then passes through the filter 18, conduits 23 and hose 25 to the dispensing gun 12. Upon opening of the valve 26 of the gun the liquid/gas solution emerges as a clear transparent solution. Before the solution has passed very far from the nozzle, and in one preferred embodiment approximately ½ inch, the solution foams as tiny gas bubbles or cells form in the liquid and convert the liquid to a white foamy appearance. This condition is illustrated in FIG. 5 where the interface 44 of the clear liquid 45 and white foam 46 is illustrated as being located above the point of control of the adhesive stream being applied to a substrate 47. The cells or bubbles continue to increase in number and size as the stream moves further from the nozzle. Even after the bead of foamed adhesive 36 is deposited on the substrate, it continues to grow in width and height for a substantial period of time, as for example one minute after it contacts the substrate 47. This growth is depicted in FIGS. 7 and 8.

We have found and one important characteristic of the foamed adhesive created by the practice of this invention is that it retains its heat and retains its "open" time (during which it retains its adhesive characteristic) for a substantially longer time than does a bead 48 (FIG. 4) of the identical adhesive dispensed under the same identical condition except for the absence of the air or gas cells in the liquid. This long "open" time enables the foamed adhesive to be closed and adhered to a substrate for a much longer period of time than the same adhesive dispensed in an unfoamed condition. Additionally, as illustrated in FIGS. 9 and 10, when the foamed "open" adhesive is compressed between two substrates 47, 47A, a major portion of the gas is forced from the foam and the adhesive spreads to a width W of approximately twice the width W' of a bead of the same adhesive dispensed from the same nozzle in a non-solvated gas condition and then subjected to the same compressive force between two substrates 47, 47A. This additional compressibility of the foamed adhesive as compared to the same adhesive in an unfoamed condition is particularly desirable in applications, as for example packaging and cartoning applications, where only a limited pressure can be placed upon the substrates, where flaps of paperboard or corrugated cartons are adhered together. In many such applications, the greater compressibility of the foamed adhesive which may be compressed to a thickness of as little as 0.009 in. under a pressure of four pounds per square inch, enables approximately one-half the total quantity of adhesive to effect the same or a better bond between two substrates than is achieved with the same quantity of adhesive in the unfoamed condition.

Figure 3:
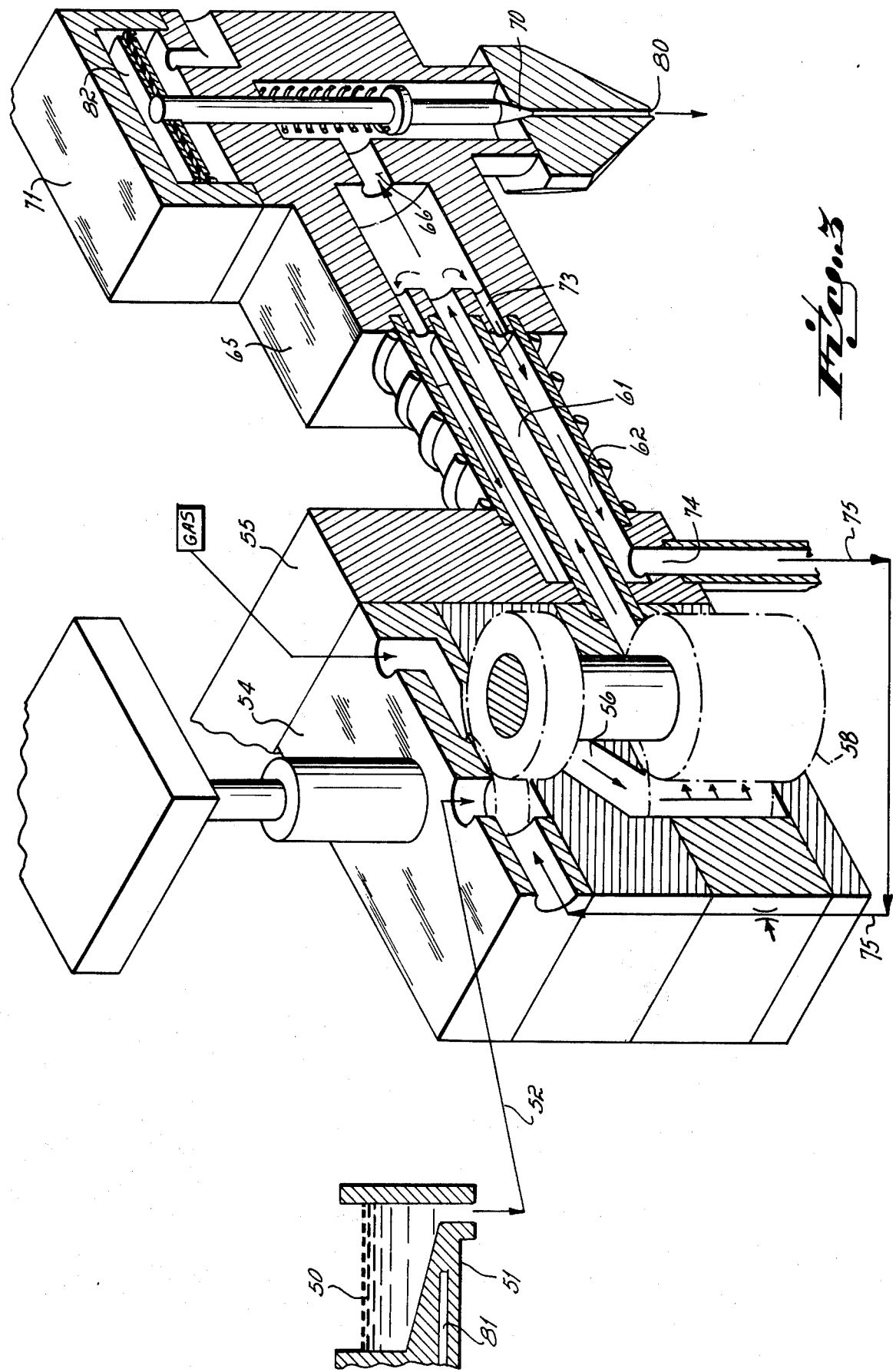
FIG. 3 is a diagrammatic perspective view partially broken away of a third modification of the system incorporating in the invention of this application.

Referring now to FIG. 3, there is illustrated still another modification of the invention of this application. In this modification molten hot melt adhesive 50 is supplied from a reservoir 51 to an inlet port 53 of a two-stage ger pump 54. As in the embodiment of FIG. 1 air or gas at a relatively low pressure, as for example five pounds per square inch, is supplied to the inlet port 53 of the pump 54 simultaneously with the molten adhesive 50. Within the first stage of the gear pump, the gas and molten adhesive are mixed and supplied through a conduit 56 to the inlet 57 of the second stage 58 of the gear pump 54. The second stage is of larger capacity than the first stage. From the second stage, a solution of molten adhesive and air or gas is supplied from the outlet port 59 through a conduit 60 to a manifold block 55. This manifold block is bored so as to receive a pair of conduits 61, 62, one 61 within the other 62. The innermost conduit 61 is operable to route the liquid adhesive/air solution to the manifold block 65 of a recirculating dispensing gun. The gun manifold block 65 has a fluid flow conduit 66 through which the molten adhesive is supplied to the outlet valve 70 of the dispensing gun 71. It also has return flow passages 73 through which molten adhesive/gas solution may be returned through the outer conduit 62, the manifold block 55, and hose 75 to the inlet 53 of pump 54. The recirculating feature of this modification serves two functions. It enables a greater quantity of air or gas to be forced into the solution and supplies a more uniform solution throughout the system than would otherwise be possible in non-recirculating systems.

As with the apparatus of FIGS. 1 and 2, the apparatus disclosed in FIG. 3 is operable to create a foam adhesive from solid thermoplastic adhesive inserted into the reservoir 51. Within the reservoir 51, the solid thermoplastic material is heated by electrical resistance heaters 81 contained in the bottom of the reservoir. From the reservoir the molten adhesive 50 flows through the conduit 52 to the inlet 53 of the two-stage gear pump 54. Simultaneously, gas, as for example air or carbon dioxide or nitrogen is supplied at a pressure of approximately 5 pounds per square inch or less to the same inlet 53. Suction created on the intake side of the gear pump 65 pulls the air or gas and liquid into the first stage of the gear pump where the air and adhesive are thoroughly mixed. That mixture is then supplied through conduit 56 to the second stage 58 of the gear pump. Within the second stage the liquid adhesive/gas mixture is placed under sufficient pressure to cause the gas to go into solution in the mixture. From the second stage of the gear pump, the solution is supplied via conduits 60, 61 and 66 to the discharge valve 70 of the dispensing gun 71. Upon actuation of a pneumatic motor 82 of the gun, the valve 70 is caused to open so that the adhesive/gas solution is dispensed from the nozzle 80. Shortly after emerging from the nozzle and being subjected to atmospheric pressure, the gas contained in the liquid gas solution evolves from the liquid adhesive/gas solution and forms closed tiny bubbles or closed cells within the adhesive. At this point the adhesive appears as a foam which then continues to grow in width and height as illustrated in FIGS. 7 and 8 as the cells grow in size. When the adhesive has solidified, those bubbles have been found to be in the range of between 0.1 millimeter and 0.7 millimeters in diameter.

So long as the apparatus of FIG. 3 is in use, some of the adhesive/gas solution flowing through conduit 61 is routed through passages 73 of the manifold block 65 back through conduits 62, 74, 75 to the inlet port 53 of the pump. There the returning solution is mixed with hot liquid adhesive from the reservoir 51. This continuous return flow of adhesive through the manifolds 65, 74 of the gun insures that the adhesive liquid/gas solution at the gun always has sufficient gas content so as to form a foam upon emergence from the nozzle of the gun and that the substrate never sits so long in the hose 61 as to cause the gas to come out of solution with the liquid adhesive.

Throughout this specification and claims the term "solution" has been used to describe the liquid adhesive/gas dispersion supplied under high pressure to the gun, which dispersion when dispensed from the gun at atmospheric pressure cools and creates a foamed adhesive. The applicants are of the view that this mixture is a true solution in which the molecules of the dissolved gas are dispersed among those of the liquid adhesive. The term though as used in the specification and the claims of the application is intended to defined and encompass the broader generic definition of solution which is a gas homogenously mixed with the molten liquid adhesive, whether or not the molecules of the dissolved gas are in fact dispersed among those of the solvent.

The primary advantage of this invention is that is enables a foamed hot melt adhesive to be inexpensively created without the use of any expensive gases or without the use of any expensive machinery. The gas utilized in the creation of the foam is usually either air, which is freely available, or nitrogen which is relatively inexpensive. Any other gas though which is inert in the presence of the liquid adhesive is equally applicable to the practice of this invention.

The equipment utilized in the practice of this invention is also inexpensive and is for the most part, equipment which is conventionally used in the melting and dispensing of hot melt adhesives. Consequently, there is very little additional equipment cost involved in the practice of the invention of this application.

The primary advantage though of the invention of this application is in the resulting adhesive product. The adhesive foam created by this invention is of approximately one-half the density of the same adhesive in the unfoamed state. It has greater surface interface area than the same adhesive in the unfoamed state. It also has increased "open" time as opposed to the same adhesive applied in the unfoamed state. These features enable the adhesive cost for many applications to be reduced by at least 50% without any sacrifice in the bonding strength of the adhered surfaces.

Another advantage of this invention derives from the thixotropic property of foamed adhesive. Unfoamed adhesive when applied to a vertical surface tends to run down that surface in the manner of a drop of water applied to a vertical substrate. In the course of running down the vertical surface the unfoamed material forms a thin film at the top and a film of increasing thickness toward the bottom of the running stream or droplet. Because of the variation of thickness of the material, it has a variable open time which often results in a bond of varying quality. Foamed adhesive on the other hand, because of its greater thixotropic property, is not so prone to run or sag on a vertical surface and therefore forms a bond of even or consistent quality upon such a surface.

Throughout this specification and the following claims we have used the phrase "hot melt thermoplastic adhesive." We intend that this phrase shall mean and be limited to a solvent free adhesive which is applied in a molten state and forms a bond upon cooling to a solid state.

While we have described several different embodiments of the invention, those persons skilled in the arts to which it pertains will appreciate other changes and modifications which may be made without departing from the spirit of our invention. Therefore, we do not intend to be limited except by the scope of the following appended claims:

We claim:

1. The method of bonding with a hot melt thermoplastic adhesive foam which comprises,
   heating solid thermoplastic adhesive to convert it to a liquid state,
   mechanically agitating the liquid adhesive in the presence of a gas so as to obtain a mixture of said gas in the liquid adhesive,
   pressurizing the mixture of liquid and gas so as to force the gas into solution with the liquid adhesive,
   dispensing the liquid and gas solution at atmospheric pressure whereby said gas is released from solution and forms a hot adhesive foam, and
   compressing said hot adhesive foam between two substrates to force gas from the foam and to form a bond between said substrates.

2. The method of claim 1 in which said mixture is placed under a pressure of at least 90 pounds per square inch to force said gas into solution.

3. The method of claim 1 in which said mixture is placed under a pressure of approximately 300 pounds per square inch to force said gas into solution.

4. The method of adhering a pair of substrates which comprises
   heating a solid thermoplastic adhesive to convert it to a liquid state,
   mechanically agitating the liquid adhesive in the presence of a gas so as to obtain a suspension of said gas in the liquid adhesive,
   pressurizing the suspension of liquid and gas so as to force the gas into solution with the liquid adhesive,
   dispensing the liquid and gas solution onto a first substrate at a pressure below the solution maintenance pressure of said gas and adhesive solution whereby said gas is released from solution and forms an adhesive foam, and
   compressing said adhesive foam between said first substrate and a second substrate before it cools so as to effect adhesion of said substrate upon subsequent cooling of said adhesive foam.

5. The method of bonding with a hot melt thermoplastic adhesive foam which comprises
   heating solid thermoplastic adhesive to convert it to a liquid state,
   mechanically agitating the liquid adhesive in the presence of air so as to obtain a suspension of air in the liquid adhesive,
   pressurizing the suspension of liquid and air so as to force the air into solution with the liquid adhesive,
   dispensing the liquid and air solution at atmospheric pressure whereby said air is released from solution and forms a hot adhesive foam,
   compressing said hot melt adhesive foam between two substrates to force gas from the foam, and
   cooling the compressed adhesive to form upon solidification a bond between said substrates.

6. The method of claim 5 in which said suspension is placed under a pressure of at least 90 pounds per square inch to force said air into solution.

7. The method of claim 5 in which said suspension is placed under a pressure of approximately 300 pounds per square inch to force said air into solution.

8. The method of adhering a pair of substrates which comprises
   heating a solid thermoplastic adhesive to convert it to a liquid state,
   mechanically agitating the liquid adhesive in the presence of air so as to obtain a suspension of air in the liquid adhesive,
   pressurizing the suspension of liquid and air so as to force the air into solution with the liquid adhesive,
   dispensing the liquid and air solution onto a first substrate at atmospheric pressure whereby said air is released from solution and forms an adhesive foam, and
   compressing said adhesive foam between said first substrate and a second substrate so as to force a portion of said air from said foam and upon cooling of said foam, effect adhesion of said substrates.

9. The method of bonding with a hot melt thermoplastic adhesive foam which comprises
   heating solid thermoplastic adhesive to convert it to a liquid state,
   mechanically agitating the liquid in the presence of a gas so as to obtain a suspension of said gas in the liquid adhesive,
   pressurizing the suspension of liquid and gas so as to force the gas into solution with the liquid adhesive,
   dispensing the liquid and gas solution at a pressure below the solution maintenance pressure of said gas and adhesive solution whereby said gas is released from solution and forms a hot adhesive foam, and
   compressing said hot adhesive foam between two substrates to force gas from the foam and to form a bond between the substrates.

10. The method of claim 9 in which said suspension is placed under a pressure of at least 90 pounds per square inch to force said gas into solution.

11. The method of claim 9 in which said suspension is placed under a pressure of approximately 300 pounds per square inch to force said gas into solution.

12. An article of manufacture comprising, a first substrate,
a second substrate adhered to said first substrate by a hot melt thermoplastic adhesive foam compressed between said substrate by the method of claim 9 in which said adhesive foam has a thickness of as little as approximately 0.009 in. after being subjected to four pounds per square inch while in the open state.

13. Apparatus for manufacturing a hot melt thermoplastic adhesive foam comprising
means for heating solid thermoplastic adhesive to convert said solid adhesive to a liquid state,
means for agitating said liquid adhesive in the presence of a gas so as to distribute said gas throughout said liquid adhesive,
means for pressurizing said liquid and gas dispersion so as to force said gas into solution with the liquid adhesive, and
means for dispensing the liquid and gas solution at a pressure below the solution maintenance pressure of said gas and adhesive solution whereby said gas is released from solution as said liquid cools and forms a solid adhesive foam.

14. The apparatus of claim 13 in which said agitating and pressurizing means comprises a gear pump.

15. The apparatus of claim 13 in which said agitating and pressurizing means comprises a two stage gear pump.

16. The apparatus of claim 13 in which said heating means comprises a heated reservoir for receiving and melting solid thermoplastic adhesive.

17. The apparatus of claim 13 in which said dispensing means comprises a dispensing gun having a outlet nozzle and a selectively openable valve for controlling flow from said gun.

18. The apparatus of claim 13 in which said dispensing gun is a continuous flow gun in which gas and liquid adhesive solution is continuously circulated through said gun when said valve is closed.

19. The apparatus of claim 18 in which said continuous flow gun includes a pair of tubes for flowing gas and liquid adhesive solution between said pressurizing and said gun.

20. The apparatus of claim 19 in which one of said tubes is contained within the other of said tubes.

21. Apparatus for manufacturing a hot melt thermoplastic adhesive foam comprising
means for heating solid thermoplastic adhesive to convert said solid adhesive to a liquid state,
means for agitating and pressurizing said liquid in the presence of a gas so as to force said gas into solution with the liquid adhesive, and
means for dispensing the liquid and gas solution at a pressure below the solution maintenance pressure of said gas and adhesive solution whereby said gas is released from solution as said liquid cools and forms a solid adhesive foam.

22. The apparatus of claim 21 in which said agitating and pressurizing means comprises a gear pump.

23. The apparatus of claim 21 in which said agitating and pressurizing means comprises a two stage gear pump.

24. The apparatus of claim 21 in which said heating means comprises a heated reservoir for receiving and melting solid thermoplastic adhesive.

25. The apparatus of claim 21 in which said dispersion means comprises a dispensing gun having an outlet nozzle and a selectively openable valve for controlling flow from said gun.

26. The apparatus of claim 25 in which said dispensing gun is a continuous flow gun in which gas and liquid adhesive solution is continuously circulated between said pressurizing means and said gun when said valve is closed.

27. The apparatus of claim 26 in which said continuous flow gun includes a pair of tubes for flowing gas and liquid adhesive solution between said pressurizing means and said gun.

28. The apparatus of claim 27 in which one of said tubes is contained within the other of said tubes.

29. The method of bonding with a hot melt thermoplastic adhesive having an extended open time in a formed uncompressed state and a short set time in a formed compressed state, which method comprises:
heating solid thermoplastic adhesive to convert it to a liquid state,
mechanically agitating the liquid adhesive in the presence of a gas so as to obtain a suspension of gas in the liquid adhesive,
pressurizing the suspension of liquid and gas so as to force the gas into solution with the liquid adhesive,
dispensing the liquid and gas solution at atmospheric pressure onto a substrate such that the dissolved gas comes out of solution and forms a hot cellular foam adhesive of extended open time,
compressing the hot cellular foam adhesive between said substrate and second substrate such that a substantial portion of the gas entrapped in said foam is released to atmosphere and the set time of the adhesive foam is substantially reduced by said compression, and
cooling the compressed adhesive to form upon solidification a bond between said substrates.

30. The method of claim 29 in which a compressive pressure of four pounds per square inch upon said adhesive foam is operative to reduce the adhesive to a thin film of approximately 0.009 in. thickness disposed between the substrates.

31. The method of bonding with a hot melt thermoplastic adhesive foam which comprises
heating solid thermoplastic adhesive to convert it to a liquid state,
obtaining a suspension of gas in the liquid adhesive,
pressurizing the suspension of liquid and gas so as to force the gas into solution with the liquid adhesive,
dispensing the liquid and gas solution at a pressure below the solution maintenance pressure of said gas and adhesive solution whereby said gas is released from solution and forms a hot adhesive foam, and
compressing said hot adhesive foam between two substrates to force gas from the foam and to form a bond between said substrates.

32. The method of claim 31 in which said suspension is placed under a pressure of at least 90 pounds per square inch to force said gas into solution.

33. The method of claim 31 in which said suspension is placed under a pressure of approximately 300 pounds per square inch to force said gas into solution.

34. The method of adhering a pair of substrates which comprises
heating a solid thermoplastic adhesive to convert it to a liquid state,
obtaining a suspension of gas in the liquid adhesive,
pressurizing the suspension of liquid and gas so as to force the gas into solution with the liquid adhesive,
dispensing the liquid and gas solution onto a first substrate at a pressure below the solution maintenance pressure of said gas and adhesive solution whereby said gas is released from solution and forms an adhesive foam, and compressing said adhesive foam between said first substrate and a second substrate so as to force a portion of the gas from said foam and upon cooling of said foam, effect adhesion of said substrates.

35. The method of claim 34 in which said suspension is placed under a pressure of at least 90 pounds per square inch to force said gas into solution.

36. The method of claim 35 in which said suspension is placed under a pressure of approximately 300 pounds per square inch to force said gas into solution.

* * * * *

UNITED STATES PATENT AND TRADEMARK OFFICE
CERTIFICATE OF CORRECTION

PATENT NO. : 4,059,714
DATED : November 22, 1977
INVENTOR(S) : Charles H. Scholl, et al It is certified that error appears in the above-identified patent and that said Letters Patent are hereby corrected as shown below:

Col. 1, line 51 "sit" should be --its--

Col. 3, line 55 "ine" should be --line--

Col. 6, line 20 "reservoir or" should be --reservoir of--

Col. 7, line 27 "ger" should be --gear--

Col. 11, line 35 "13" should be --17--

Col. 12, line 14 "formed" should be --foamed--

Col. 12, line 15 "formed" should be --foamed--

Signed and Sealed this

Ninth Day of May 1978

[SEAL]

Attest:

RUTH C. MASON
Attesting Officer

LUTRELLE F. PARKER
Acting Commissioner of Patents and Trademarks